United States Patent [19]

Kozies et al.

[11] Patent Number: 5,216,224

[45] Date of Patent: Jun. 1, 1993

[54] WINDOW WITH AN IMPROVED PARIETODYNAMIC EFFECT

[75] Inventors: Jérôme Kozies, Compiègne; Jacques Fremauy, Bougival; Roland Brechot, Bry sur Marne; Louis Legué, Rueil Malmaison, all of France

[73] Assignees: Saint Gobain Vitrage International, Courbevoie; Acome, Paris, both of France

[21] Appl. No.: 658,583

[22] Filed: Feb. 21, 1991

[30] Foreign Application Priority Data

Feb. 21, 1990 [FR] France .................... 90 02088

[51] Int. Cl.⁵ ............................ H05B 3/10
[52] U.S. Cl. ............................ 219/213; 165/47; 165/135; 237/81
[58] Field of Search ............. 34/93; 98/90, 36, 40.18; 237/53; 219/201, 213, 214, 543, 522; 165/47, 49, 53, 135; 454/193

[56] References Cited

U.S. PATENT DOCUMENTS

| 2,107,523 | 2/1938 | Coe | 237/53 |
| 2,200,045 | 5/1940 | Siefken | 98/40.18 X |
| 2,561,290 | 7/1951 | Payant | 237/53 |
| 3,231,986 | 2/1966 | Touton | 34/93 X |

FOREIGN PATENT DOCUMENTS 279039 11/1988 Japan ........................... 98/90

Primary Examiner—Henry A. Bennet
Attorney, Agent, or Firm—Oblon, Spivak, McClelland, Maier & Neustadt

[57] ABSTRACT

The outer wall (19) of a heated room. In a variant, the air is heated by contact with the wall (19), which then is equipped with a Coanda effect air circulation (21). The air (24) is preheated before entering the room.

16 Claims, 2 Drawing Sheets

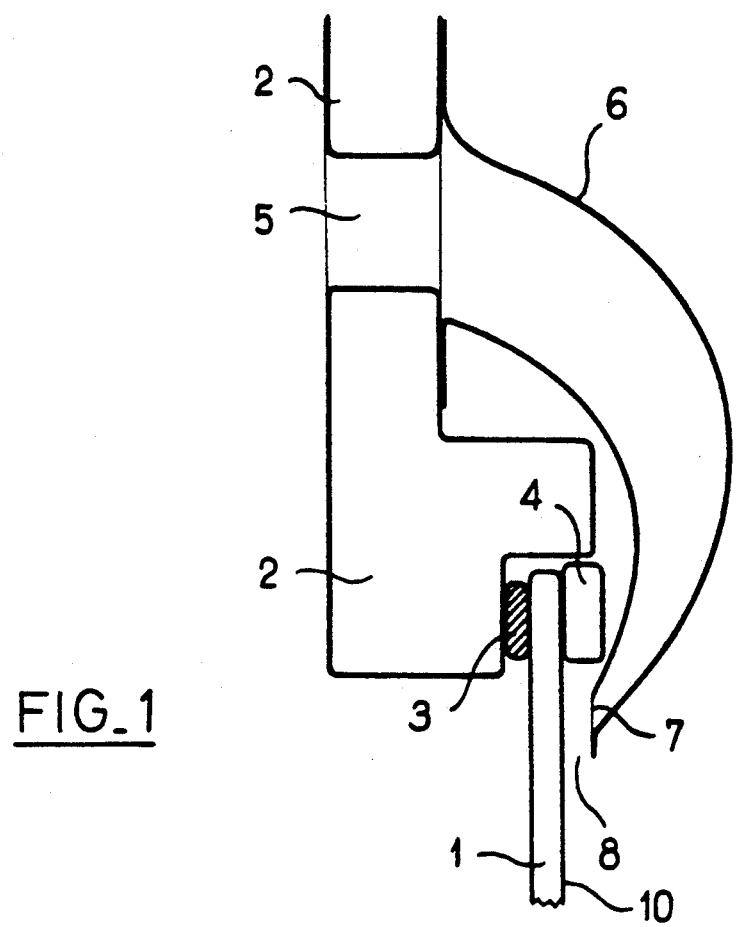
FIG_1
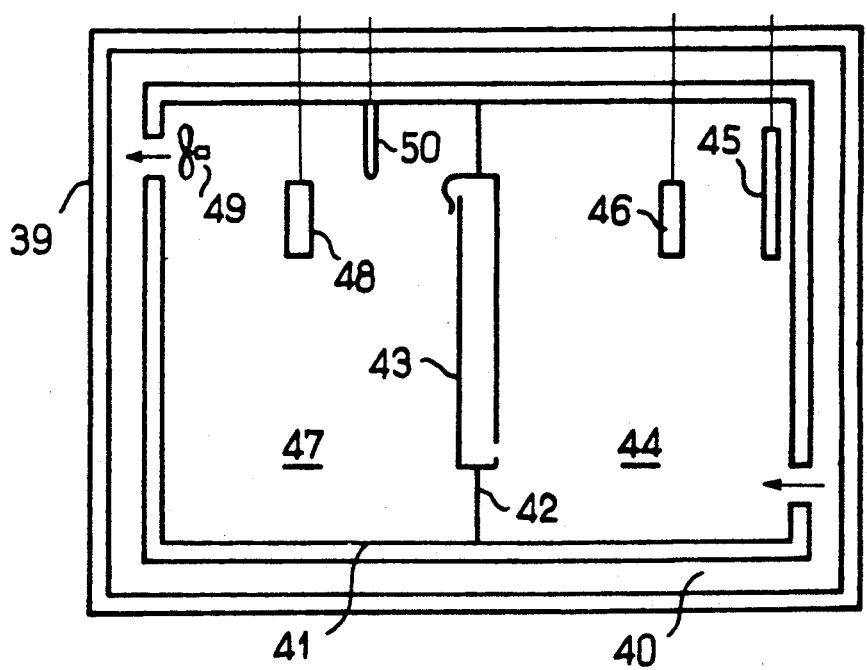
FIG_4 ns to the insulation of the walls of a room using the circulation of air along the wall and which is known as "parietodynamic insulation" and more specifically that utilizing the Coanda effect, which makes the air flow along the wall.

Coanda effect parietodynamic thermal insulation of rooms has e.g. been described in French patent 2528 473. This method makes it possible by using simple means to lower the temperature of the outer surface of the wall, whilst heating the air flowing along the inner surface to the same wall. The reduction of the outer surface temperature reduces heat exchanges with the exterior, whilst the corresponding reduction of the internal surface temperature is entirely compensated by the heating of the air. Thus, there is only a reduction of heat losses. Nevertheless this method has limits because, despite the Coanda effect, the moving air flows became detached from the wall, so that the distance over which the exchange occurs is limited, so that the wall surface cannot participate in the phenomenon and the improvement to the thermal insulation of the wall remains limited. In addition, although the process makes it possible to reduce losses, it does not in itself constitute a heating means. The aim of the invention is consequently to broaden the field of use of the known process in order to improve the insulation, whilst providing a means for supplying heat to the room.

SUMMARY OF THE INVENTION

The invention consequently proposes a process and an apparatus for the thermal insulation of the walls of rooms by the circulation of air as a result of the Coanda effect along the inner surface of the wall in which the air is additionally heated beforehand. In a variant, said prior heating is produced by the circulation of the air from the outside between the outer surface of the wall and a second wall, which is parallel to the first on the outside. In a second variant, the air is heated by an independent heating means, In another variant, the surface along which the air flows as a result of the Coanda effect has a heating action and consequently makes it possible to raise the temperature thereof.

According to the invention, all the walls are advantageously made from transparent material such as glass. Thus, if the wall is heated, it is produced by a thin conductive transparent layer, which can advantageously incorporate metals and/or metal oxides, which are transparent and optionally conductive and which are then preferably deposited by organometallic powder pyrolysis. The layer is in contact with the air of the double wall on the side of the inner wall directed towards the outside of the room and has an emissivity below 0.40.

BRIEF DESCRIPTION OF THE DRAWINGS

The invention is described hereinafter relative to the attached drawings, wherein show:

FIG. 1 Diagrammatically an air intake opening enabling the replacement air to flow along the inner surface of a wall.

FIG. 4 A window testing device.

DETAILED DESCRIPTION OF THE PREFERRED EMBODIMENTS

Figure 2:
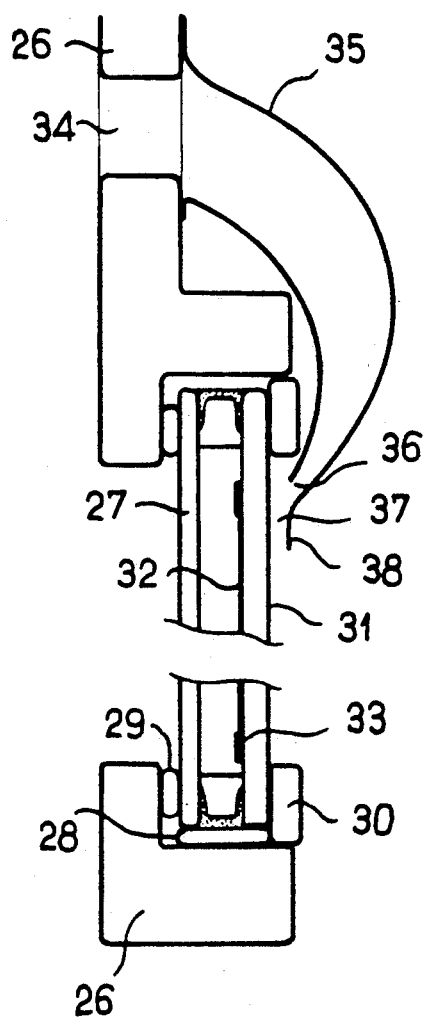
FIG. 2 The combination in the same window of two parietodynamic effects, namely that of the double wall and the Coanda effect.

In FIG. 1, which represents the adaptation of the Coanda system to parietodynamic insulation, it is possible to see an e.g. glass wall 1, mounted in a frame 2 by means of a putty 3, which remains plastic and a bead 4 fixed by not shown means. An air intake 5 enables the external air to be used for replacing the atmosphere of the room to enter the latter under the effect of a pressure difference generally obtained by a central suction system, which usually acts on several rooms, e.g. all the rooms in a flat or dwelling. The originality of the per se known Coanda system is based on the design of the deflector 6 made from sheet metal or a plastics material, which channels the admitted air over the entire width of the wall or panel 1. The deflector is terminated by a slot 7 and by a narrow passage 8. The air flows from the passage 8 flow along the surface 10 of the wall 1.

FIG. 2 shows a first variant of a system according to the invention. It is possible to see a plastics material window 11 with its opener 12 and its joints 13, 14. It is equipped with a single glazing 15 mounted with joints 16 and a bead 17 on shims 18. The said opener is equipped with an overglazing 19 carried by shaped sections 20. It can be opened in order to allow the cleaning of the inner faces of the glazings. In the upper part of the opener has been fixed in a detachable manner so as to permit the manipulation of the overglazing 19, a deflector 21 making it possible to obtain a Coanda effect on the face 22 of the overglazing 19 directed towards the inside of the room. This system is of the same type as that of FIG. 1. The novelty is due to the fact that the air, prior to entering the deflector 21 at 23 has flowed from bottom to top int he space between the glazings 15 and 19. Prior to this, the air has passed through the orifices 24, 25 made in the shaped sections of the opener. As previously, the movement of the air, on the first occasion from bottom to top between the two glazings 15, 19 and on the second occasion from top to bottom along the surfaces 22 is obtained by the action of a central ventilation system, which places the entire room under a slight depression compared with the exterior.

Thus, prior to entering the Coanda deflector duct, the air has already been subject to preheating by "licking" the interior of the glazing 19. During its second passage, from top to bottom, it is charged for a second time with the heat extracted from the glazing 19. Consequently the efficiency of the parietodynamic Coanda system is improved compared with that of the Coanda system alone.

Figure 3:
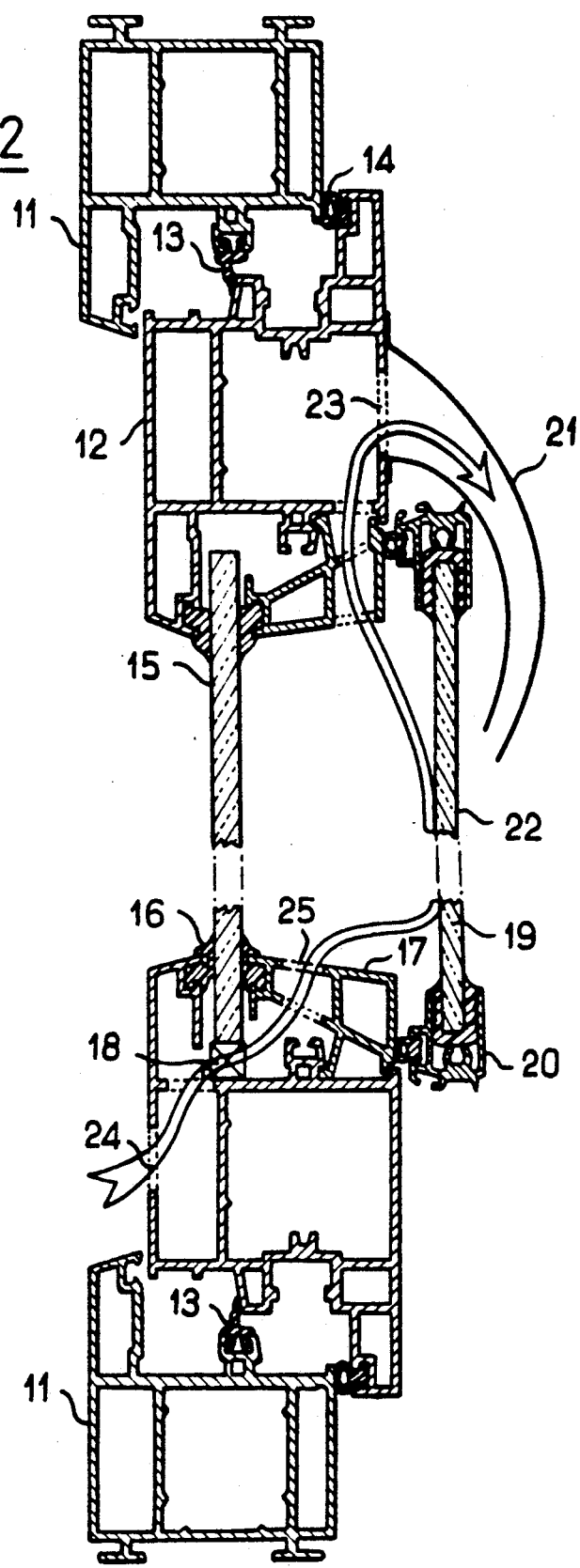
FIG. 3 The Coanda effect on a double heating glazing.

FIG. 3 shows the second variant of the system according to the invention. It is possible to see a wooden frame 26, which supports an insulating glazing 27 mounted in a conventional manner in the frame 26 with the aid of shims 28, putty 29 and beads 30, whose fixing means are not shown.

On the inner face of its inner glass plate 31, the glazing 27 is provided with a thin conductive, transparent layer 32 supplied with an electric current by leads 33. The layer is e.g. of metal oxides obtained by pyrolysis of pulverulent tin organometallic salts deposited on the hot glass in accordance with the process described by French patent 2 427 141. The cold air taken from the exterior of the room enters through the elongated orifice 34 formed in the frame 26. It then enters the Coanda deflector duct 35, passes through the slot 36 and then the narrow passage 37, prior to leaving the deflector level with the lip 38. The air flows then follow the surface of the glazing 31. The glazing 31, whose temperature rises as a result of the Joule effect produced by the electric current across the layer 32, has a high temperature gradient compared with the air coming from the outside and which consequently takes a considerable quantity of heat therefrom. This method combining the Coanda effect and a heating glazing consequently makes it possible to very significantly heat the air entering the room. This significantly improves comfort, because the cold air flows are less significant and also the system in itself constitutes a heating means which, in temperate regions and if glazed surfaces are of considerable dimensions, is in itself sufficient to heat the room in question. The system also leads to a secondary advantage. When a sealed insulating glazing is transformed into a heating glazing, the temperature rise of the internal air jet leads to an increase in the internal pressure, which acts on the bonding of the peripheral joints of the glazing and can lead to its deterioration. By very significantly limiting the temperature rise of the glazing, the Coanda effect brings about a considerable improvement in this connection.

In the preceding example, the heat supplied to the external air is in fact supplied by a heating glazing, but it would still remain in the scope of the invention to heat the air prior to its leaving the Coanda deflector and by using any appropriate means, e.g. a bar-shaped electrical resistor, a hot air circulation tube, etc.

However, within the scope of the invention, it is also possible to adopt a third variant, which is in reality a combination of the first two variants. It consists of using the apparatus described in FIG. 2 and replacing the inner glazing 19, which is single glass plate, by a heating glazing constituting a heating window, such as is e.g. described in U.S. patent application Ser. No. 07/497,676 filed on Mar. 23, 1990. The heating glazing is then "licked" twice by the external fresh air flow, once from bottom to top in the space between the two glazings and on a second occasion from top to bottom by the Coanda effect.

The advantages resulting from this variant are significant. The double air passage makes it possible t significantly reduce the temperature of the heating glazing for a given electric power, which makes it possible to maintain high efficiency and comfort, despite a considerable calorific supply. Thus, in numerous cases the only heating means for the room can be constituted by the heating window.

Comparative tests (I, II, III and IV) have made it possible to measure these advantages and FIG. 4 shows the installation used. It has a double enclosure, the outer enclosure 39 being separated by a guard ring 40 from the inner enclosure 41, all the walls being insulating.

The inner enclosure is subdivided into two parts by a partition 42 having the window 43 to be tested. The overall dimensions of the window are 1.50×1.05 m and it is successively equipped with four different systems. It firstly has a combination of the type of FIG. 2, in which the Coanda deflector 21 has been eliminated and the external air has been directly passed through the upper crossmember. Furthermore, the said window has been equipped with a heating overglazing 19 (test I). The second combination is identical, but has a Coanda deflector. Here again, the air directly penetrates the upper part (test II). The third variant is a heating window with a bottom to top air circulation in the double wall, but without the Coanda effect (the deflector is removed, test III). The fourth variant combines the heating window, the circulation in the wall and the Coanda effect (test IV). It is shown in FIG. 4, where the right-hand part 44 of the inner enclosure is isothermal at 7° C., its temperature being kept constant by the combined effects of an evaporator 45, which functions permanently, and a heating resistor 46 which, due to a proportional regulation, stabilizes the ambient temperature. In the left-hand part 47, a heating resistor 48 makes it possible, when desired, to regulate the ambient temperature to 20° on this occasion.

It is also possible to see an extractor 49 enabling the circulation of the air from the cold part 44 towards the hot part 47 of the inner enclosure, by making it pass through the test window. During the testing of the four aforementioned combinations, the flow rate was approximately 90 m$^3$/h, which corresponds to normal ventilation (one volume per hour) of a large dwelling room. Numerous temperature measurements were carried out during the tests. In particular these involved the external temperature of the cold side wall (upper part), the cold air intake temperature, i.e. on entering the enclosure 44 and also the possibly heated air outlet temperature, i.e. when it leaves the wall to be tested on entering enclosure 47. An adapted probe 50 also made it possible to carry out resultant temperature measurements, i.e. it also took into account the thermal radiation.

During the tests the heating window was of height 1.25 m and width 0.80 m. It was made from 4 mm thick, tempered glass, equipped with a fluorine-doped tin oxide layer, which had a surface resistance of 60 ohm$^2$ and an emissivity of 0.30.

For each of the four tests (I, II, III and IV) the initial step was to stabilize the temperatures in the two rooms 44 and 47 respectively at 7° and 20° C., said stabilization continuing for 90 minutes. At the end of this period, the resistor 48 was disconnected, whilst the control continued in room 44. The test runs started by switching on the heating for the heating window subject to an electric power of 600 watts. On this occasion the measurements were made after stabilization for 90 minutes.

The results for the four tested configurations are given in the following table.

TABLE I

| | Air entry | Air exit | Resultant temperature | Cold glazing temperature | Exchange height (cm) |
|---|---|---|---|---|---|
| Test I, heating only | 12° C. | 13° C. | 23° C. | 32° C. | — |
| Test II, heating + Coanda | 12° C. | (13° C.) | 23° C. | 27° C. | 80 |
| Test III, heating + | 8° C. | 31° C. | 24° C. | 24° C. | — |

TABLE I-continued

| | Air entry | Air exit | Resultant temperature | Cold glazing temperature | Exchange height (cm) |
|---|---|---|---|---|---|
| circulation | | | | | |
| Test IV, heating + circulation + Coanda | 8° C. | (29° C.) | 25° C. | 23° C. | 40 |

For tests II and IV, the air outlet temperature is placed in brackets, because it is not significant due to the fact that the said air was then heated by the Coanda effect in a manner which could not be measured. However, the value of 29° C. for test IV compared with 31° C. for test III shows that the heating glazing is less hot when the Coanda effect functions. In the final column is given the fraction of the height of the heating glazing, measured from its upper edge, whose temperature is modified by the Coanda effect. It obviously increases as the air "licking" the surface of the glazing becomes colder (these measurements were carried out using an infrared camera). However, the most significant result is that of the external temperature of the cold side of the window (cold glazing temperature), so that the lower this is, the lower the losses. The improvement brought about by the Coanda effect are clear on comparing test I (32° C.) with test II (27° C.) on the one hand and test III (24° C.) and test IV (23° C.) on the other. Thus, the losses on the cold side are proportional to the difference between said temperature and the 7° C. of the cold enclosure. In test IV, they are only a small part (approximately ⅛) of what they were in test I.

The preceding tests demonstrate that the combination of a heating of the air and the Coanda effect leads to significant advantages, no matter whether this is in the case of parietodynamic insulation only or, a fortiori, in the case of said same wall associated with a heating glazing. In the latter case it can be seen that there is no comfort reduction in the case of a lower heat exchange on the window measured from the tip (40 cm in example IV instead of 80 cm in example II). Thus, for a person in the vicinity of the window, the movements of the air at his height would be less significant and as on the one hand the temperature of the inner wall is slightly higher in test IV than in test II and as on the other hand the surface not cooled by the Coanda effect is larger, the overall effect produced by the thermal radiation of the wall would be significantly higher and the sensation of heat would be greater.

We claim:

1. A process of thermal insulation of a room wall comprising inner and outer walls defining a space therebetween, comprising the steps of:
   heating exterior air by flowing the exterior air in the space between said inner and outer walls, so as to draw heat from the space; and
   causing the exterior air to flow downwardly along and substantially parallel to an internal surface of the inner wall,
   whereby an external surface of the wall is cooled and the room is insulated by the Coanda effect.

2. A process of thermal insulation of a room wall, comprising the steps of:
   electrically heating the wall; and
   causing exterior air to flow downwardly along and substantially parallel to an internal surface of the wall for insulating and cooling the wall by the Coanda effect,
   whereby the downward air flow draws heat from the wall so that an external surface of the wall is cooled.

3. An apparatus for thermal insulation of a room wall comprising inner and outer walls defining a space therebetween, comprising the steps of:
   means for heating exterior air by flowing the exterior air in the space between said inner and outer walls, so as to draw heat from the space; and
   means for causing the exterior air to flow downwardly along and substantially parallel to an internal surface of the inner wall,
   whereby an external surface of the wall is cooled and the room is insulated by the Coanda effect.

4. An apparatus for thermal insulation of a room wall comprising the steps of:
   means for electrically heating the wall; and
   means for causing exterior air to flow downwardly along and substantially parallel to an internal surface of the wall for insulating and cooling the wall by the Coanda effect,
   whereby the downwardly air flow draws heat from the wall so that an external surface of the wall is cooled.

5. The process of claim 2 wherein said room wall includes an electrically conductive heating layer.

6. The process of claim 1 or 2 wherein said room wall is transparent.

7. The process of claim 5 wherein said room wall is transparent and said conductive layer is semi-transparent.

8. The process of claim 5 wherein said conductive layer is on the external surface of the room wall and has an emissivity below 0.40.

9. The process of claim 8 wherein said conductive layer includes at least one layer from the group consisting of: a metal and metal oxides obtained by pyrolysis of pulverulent organometallic compounds.

10. The apparatus of claim 4 wherein said room wall comprises a double wall.

11. The apparatus of claim 4 wherein said heating means comprises an electrically conductive heating layer on said room wall.

12. The apparatus of claim 11 wherein said conductive layer is on the external surface of said room wall.

13. The apparatus of claim 12 wherein said conductive layer has an emissivity below 0.40.

14. The apparatus of claim 3 wherein said room wall is transparent.

15. The apparatus of claim 11 wherein said conductive layer is obtained by pyrolysis of a product based on an organometallic salt.

16. The apparatus of claim 15 wherein said conductive layer incorporates a fluorine doped tin oxide.

* * * * *